Sept. 26, 1950 R. J. MILLER 2,523,707
PRODUCTION OF HYDROXYTOLUENES
Filed June 21, 1948
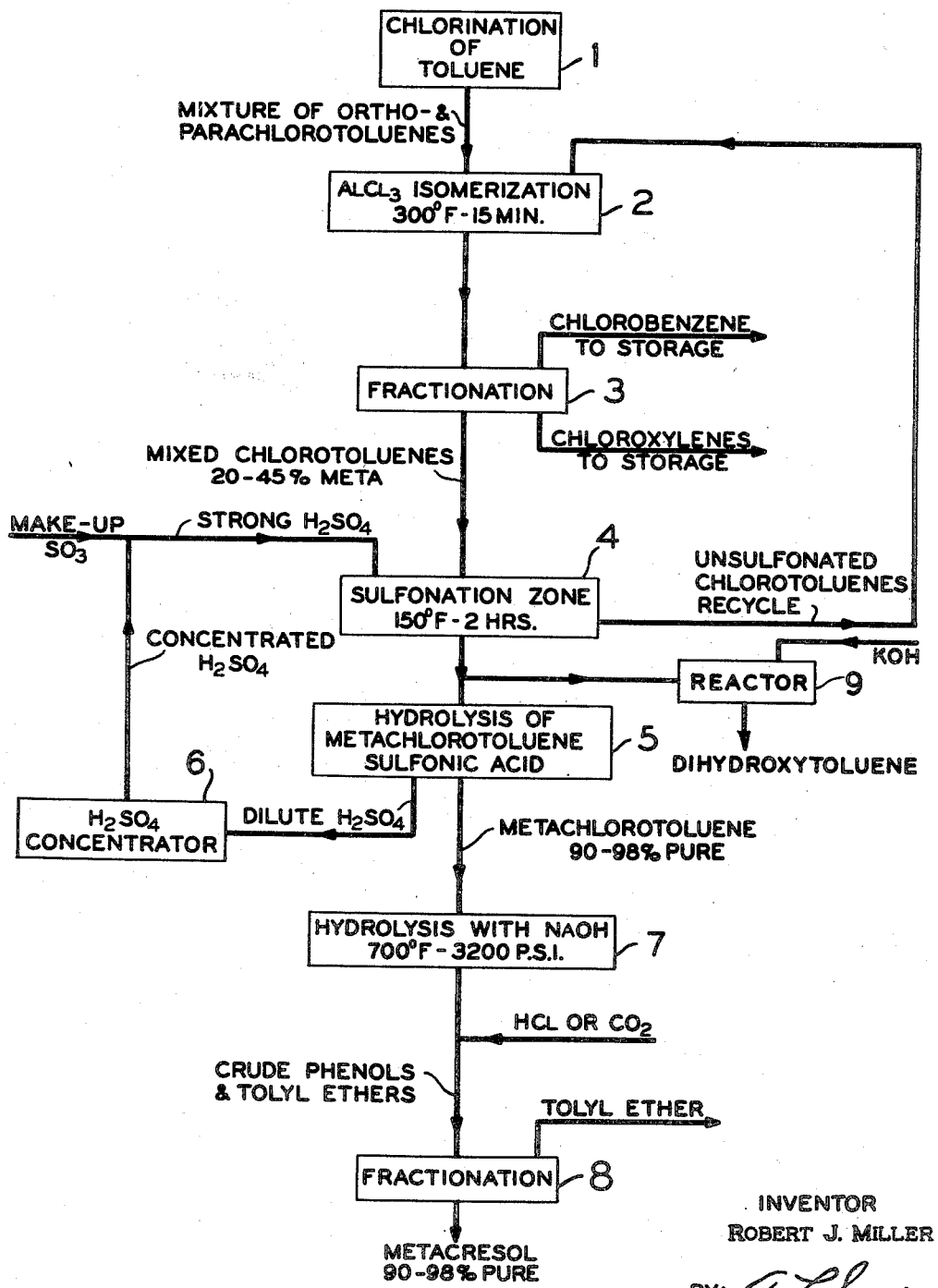
INVENTOR
ROBERT J. MILLER
BY:
ATTORNEYS Patented Sept. 26, 1950

2,523,707

UNITED STATES PATENT OFFICE 2,523,707

PRODUCTION OF HYDROXYTOLUENES

Robert J. Miller, Berkeley, Calif., assignor to California Research Corporation, San Francisco, Calif., a corporation of Delaware Application June 21, 1948, Serial No. 34,286

18 Claims. (Cl. 260—629)

This invention relates to the preparation of hydroxytoluenes from mixtures of chlorotoluene isomers. More particularly, it relates to the manufacture of metacresol from mixtures of chlorotoluene isomers.

Production of monohydroxytoluenes or cresols from chlorotoluenes has been reported in the art. However, since but little metachlorotoluene is produced in the chlorination of toluene, the chlorotoluene material used for the production of cresols ordinarily represents a mixture substantially consisting of ortho- and para-chlorotoluenes. Subsequent treatment of this mixture, which consists in contacting it with aluminum chloride as an isomerization catalyst at a temperature of the order of 300° F. and fractionally distilling the resulting isomerization mixture to remove chlorobenzene and chloroxylenes, results in the recovery of a mixture of ortho-, para- and metachlorotoluenes, wherein the metachlorotoluene content may be as high as about 45% or more by weight based on the total weight of the chlorotoluene mixture. Such a mixture of chlorotoluenes may be converted to a mixture of cresols by the application of caustic hydrolysis. However, because of the close proximity of the boiling temperatures of the three cresol isomers and the similarity of their other chemical and physical properties, the recovery of pure metacresol from the hydrolysis product mixture is a rather difficult operation.

It has been proposed to eliminate orthochlorotoluene from the mixture of its isomers by high efficiency fractionation (superfractionation). In this case, the final resulting cresol product is a mixture of para- and meta-isomers, and a satisfactory separation of individual para- and metachlorotoluenes from each other by distillation, prior to their conversion to cresols by hydrolysis, is again rendered extremely difficult by the close proximity of the boiling temperatures of para- and metachlorotoluenes (meta-, B. P.=324.3° F.; para-, B. P.=324.5° F.).

It is, therefore, the object of the present invention to provide a process for the recovery of substantially pure metachlorotoluene from a mixture of its isomers.

A particular object of the invention is to provide a process for separating metachlorotoluene from a mixture of its isomers by selective sulfonation and hydrolysis of the sulfonation product.

Another object of the invention is to provide a new continuous process for the production of metacresol of relatively high purity from mixtures of chlorotoluene isomers.

Still another object of the invention is to provide a process for producing metachlorotoluene from a mixture of its isomers, which comprises isomerizing chlorotoluenes, selectively sulfonating metachlorotoluene in the isomerization product, and recovering by hydrolysis the metachlorotoluene from the sulfonation mixture.

An additional object of the invention is to provide a new process for preparing metacresol and, if desired, dihydroxytoluenes, from the product of the aforementioned sulfonation.

Other objects of the invention will become apparent from the following description.

I have found that metachlorotoluene may be readily separated in good yield and in a relatively high state of purity from a mixture of chlorotoluene isomers by treating such a mixture with strong sulfuric acid under such conditions as to effect selective sulfonation fo metachlorotoluene to metachlorotoluene sulfonic acid, while para- and orthochlorotoluenes remain unaffected by the sulfuric acid and are separated from the metachlorotoluene sulfonic acid. On hydrolyzing this latter, substantially pure metachlorotoluene is readily obtained.

This novel reaction may be incorporated into an improved, continuous, integrated process for the manufacture of metacresol from mixtures of chlorotoluene isomers, which comprises a sequence of coordinated steps of isomerizing a mixture of chlorotoluenes, selectively sulfonating the resulting mixture of ortho-, para-, and metchlorotoluene isomers to form and to separate metachlorotoluene sulfonic acid, hydrolyzing this acid to yield substantially pure metachlorotoluene, subjecting this latter product to caustic hydrolysis, and recovering metacresol of relatively high purity from the product of this last hydrolysis.

Sulfuric acid to be used for sulfonating chlorotoluene may vary in concentration from 80% sulfuric acid to 20% fuming acid, i. e., oleum containing 20% free $SO_3$. However, 96% sulfuric acid is preferred, having been found to be most economical and satisfactory. Usually the sulfonation treatment is carried out at a temperature from about 100° F. to about 210° F., that of about 150° F. being preferred. The quantity of sulfuric acid required for sulfonation depends on the concentration of the acid and the temperatuhe of sulfonation reaction. Since all of the variables in the sulfonation reaction: temperature, acid concentration, amount of acid, and time of contact, are more or less interdependent, exact numerical values cannot be assigned in defining ranges for the preferred conditions of sulfonation.

It will be noted, however, that on increasing the amount of sulfuric acid, a greater amount of chlorotoluene material will undergo sulfonation. Since metachlorotoluene is sulfonated at a greater rate than its two other isomers, it may occur that in the presence of too much acid, all the metachlorotoluene will become sulfonated, and then the acid will begin to sulfonate the other isomers in the charge. Likewise, a higher concentration of sulfuric acid will result in a faster reaction and a better utilization of the acid. Higher temperatures also will have an effect similar to that of a higher concentration. Finally, the longer the time of contact, the greater will be the extent of utilization of the acid.

The control of the aforementioned process variables will be readily understood by those skilled in the art in each particular case in the light of the present description and from the results of some of the representative sulfonation runs shown in Table 1 of this specification.

The yield of metachlorotoluene sulfonic acid is equal to about 50% or more, depending on the extent of sulfonation, temperature, strength of sulfuric acid and the type of equipment used.

The metachlorotoluene sulfonic acid obtained by the above-mentioned selective sulfonation may next be divided into two feed streams, one of which is processed to metacresol, while the other may be converted to a dihydroxytoluene, as will be shown hereinafter.

The sulfonic acid feed stream destined for conversion to metacresol is subjected to hydrolysis by diluting with water and heating to a temperature from about 300° F. to about 360° F. Substantially pure metachlorotoluene is obtained from this hydrolysis and is subsequently converted to metacresol, either by a continuous or by a batch-type caustic hydrolysis, as will be explained in detail in the following description of my combined process for production of metacresol and dihydroxytoluenes with reference to the flow-diagram given in the attached drawing. In this flow-diagram, after chlorinating toluene, as shown in 1, the resulting mixture of ortho- and parachlorotoluenes is treated in isomerization zone 2 with aluminum chloride at a temperature from about 200° F. to about 350° F., and preferably at about 300° F., for at least 15 minutes. The isomerization product is withdrawn from zone 2 and subjected to fractional distillation, as shown in 3, to separate chlorobenzene which goes overhead and passes to storage, and chloroxylenes which are recovered as bottoms and are either sent to storage or discarded. The mixed chlorotoluene fraction from this distillation may contain from 20% to 45% or more by weight of metachlorotoluene. This mixed fraction is introduced into sulfonation zone 4 and is treated for about two hours with strong sulfuric acid at a temperature from about 100° F. to about 210° F., and preferably at about 150° F. A layer of metachlorotoluene sulfonic acid is selectively formed by this sulfonation treatment, and the supernatant layer of unsulfonated chlorotoluenes is separated from the acid layer and recycled to isomerization zone 2. The sulfonic acid layer is withdrawn to hydrolysis zone 5 and hydrolyzed by diluting with water and heating to a temperature from about 300° F. to about 360° F. to yield metachlorotoluene of at least 90% purity (by weight of the total hydrolysis product), though purities of as high as 98% may be obtained in a yield equal to about 50% or more of metachlorotoluene present in the original chlorotoluene mixture before sulfonation.

As indicated hereinbefore, a desired portion of the sulfonic acid layer may be withdrawn from sulfonation zone 4 to be converted to a dihydroxytoluene in reactor 9.

The pure metachlorotoluene product obtained from the aqueous hydrolysis of metachlorotoluene sulfonic acid is subjected for at least 15 minutes to hydrolysis with aqueous sodium hydroxide, as shown in 7, at a temperature from about 600° F. to about 700° F., and under a pressure sufficient to maintain the reactants in liquid phase. A pressure of 3200 p. s. i. is most satisfactory, when the temperature is about 700° F. and the reaction time is about one hour. The concentration of sodium hydroxide ranges from about 5% to 14% and up, and preferably from about 8% to about 10%, while the mol ratio of sodium hydroxide to metachlorotoluene is equal to at least 2:1. On leaving caustic hydrolysis zone 7, the product is neutralized with an acid stronger than cresol, e. g., $H_2SO_4$, $HCl$, or $H_2CO_3$, and yields a mixture of cresol and from about 15% to about 20% by weight of tolyl ethers.

It has been found that, contrary to what could have been expected in the light of previous experience reported in the literature, the conversion of metachlorotoluene to cresol by hydrolysis with sodium hydroxide is not attended by isomerization. Consequently, metacresol of relatively high purity is produced from metachlorotoluene, and in the amount proportional to the concentration of metachlorotoluene in the chlorotoluene charge subjected to sulfonation. Conventional distillation, as shown in 8, is resorted to in order to separate tolyl ethers from metacresol, which is finally recovered in a high state of purity from at least 90% to as much as 98%.

Some of the representative sulfonation test data are tabulated in Table I below. These data indicate that the maximum separation of metachlorotoluene sulfonic acid is secured by using about 0.8 pound of 96% sulfuric acid at a temperature of about 150° F. Increasing the amount of acid above about 0.8 pound and/or increasing the temperature of sulfonation does not result in a marked improvement of the yield of metachlorotoluene sulfonic acid. Lowering the amount of acid decreases the yield of metachlorotoluene sulfonic acid.

TABLE I

*Sulfonation of chlorotoluenes for 2 hours*

| Test No. | Meta-Isomer in Charge, Per Cent | 96% $H_2SO_4$/lb. Chlorotoluene Charged, Lbs. | 96% $H_2SO_4$/lb. Meta-Isomer in Charge, Lbs. | Temp. of Sulfonation, °F. | Meta-Isomer Removed as Pure Meta, Per Cent |
|---|---|---|---|---|---|
| 1 | 20 | 0.34 | 1.7 | 150 | 23 |
| 2 | 23 | 0.80 | 3.5 | 150 | 47 |
| 3 | 24 | 1.6 | 6.7 | 150 | 51 |
| 4 | 20 | 0.34 | 1.7 | 210 | 25 |
| 5 | 27 | 0.81 | 3.0 | 210 | 48 |
| 6 | 35 | 0.80 | 2.3 | 150 | 46 |

Metachlorotoluene sulfonic acid obtained in these runs is hydrolyzed by charging the acid layer and water into a 500 ml. still provided with a separatory funnel for the addition of more water, if necessary, to control the temperature. In a typical example, an acid layer charge of 122 g. requires the use of 97 g. of water. Dilute sulfuric acid separated in this hydrolysis from substantially pure metachlorotoluene is sent to a concentrator, numbered 6 in the flow-diagram; following reconcentration in 6, the acid is combined with some make-up $SO_3$ and returned to sulfonation zone 4.

It must be observed that other suitable methods of hydrolyzing the acid layer are likewise applicable, for instance, by passing steam, or by adding water and effecting physical separation under pressure.

Small amounts of ortho- and parachlorotoluenes may occasionally dissolve in the sulfuric acid. In such a case, the sulfonic acid layer from the sulfonation treatment should be subjected to steam distillation to remove ortho- and para-isomers prior to the hydrolysis of the remaining metachlorotoluene sulfonic acid at from 300° F. to 360° F.

The step of caustic hydrolysis may be carried out, if desired, in the presence of a catalyst, such as metallic copper, which tends to speed the reaction. In a continuous operation, high pressure equipment with flow rates in the turbulent flow range, such as a Monel-lined tube, may be used for caustic hydrolysis. In a batch-type operation, a high-pressure stirred or rocked autoclave, lined with Monel, is preferred, Monel offering a better resistance than steel to the corrosive action of sodium hydroxide at high temperatures.

As previously noted, the metachlorotoluene sulfonic acid withdrawn from the sulfonation zone is split to provide a separate feed stream for conversion to dihydroxytoluene in reactor 9. This stream is treated in the following manner: It is neutralized, and the resulting sodium or potassium chlorotoluene sulfonate is added, while stirring vigorously, over a period of about one hour to a melt of sodium or potassium hydroxide, preferably the latter, maintained at about 600° to about 650° F. The melting of sodium or potassium hydroxide may be effected, e. g., in a cast-iron or nickel-lined pot, or reaction vessel, equipped with an adequate stirrer and provided with means for keeping an inert atmosphere over the reacting materials. About 5 to 10 mols of hydroxide is required per one mol of chlorotoluene sulfonate.

An alternative procedure consists in reacting the metachlorotoluene sulfonic acid directly with the hydroxide melt, in which case the number of mols of hydroxide required per one mol of the acid will range from about 6 to 11.

Stirring is continued for another hour at the aforementioned temperature, whereupon the contents of the pot, or reaction vessel, are dissolved in water and acidified with a suitable strong acid, e. g., sulfuric or hydrochloric. The resulting solution is next extracted with an appropriate solvent, such as ether, and finally, dihydroxytoluenes are recovered upon evaporation of the solvent.

It is to be noted that the present invention is particularly adapted to the treatment of an "equilibrium mixture" of ortho- and parachlorotoluenes resulting from chlorination of toluene. The term "equilibrium mixture" is used here to designate a chlorotoluene fraction containing about 2 mols of orthochlorotoluene to about 1 mol of parachlorotoluene. However, it is to be understood that other mixtures of chlorotoluene with different ratios of ortho- to para-isomers may be successfully used in the process of the present invention, and that this latter is by no means limited to the equilibrium mixture of ortho- and parachlorotoluenes.

As hereinbefore disclosed, the invention offers an effective integrated process for securing metacresol of relatively high purity from mixtures of chlorotoluene isomers by a novel, coordinated sequence of treating steps. In particular, it makes possible the production of substantially pure metachlorotoluene from a mixture of chlorotoluenes which contains up to 45% or more by weight of metachlorotoluene by sulfonating that mixture and hydrolyzing the resulting metachlorotoluene sulfonic acid. From this latter, metacresol in a relatively high state of purity may then be obtained by caustic hydrolysis. In view of the great demand for pure metacresol as an intermediate for the manufacture of phenolic-type resins, plasticizers, etc., and of the difficulties usually encountered in securing a pure metacresol material, the production of this metacresol of relatively high purity represents a significant contribution to the art.

Finally, it is to be understood that examples contained in the above description are given by way of illustration only and are not to be deemed as limiting the invention, which includes in its scope all modifications and changes of the process details, except as limited by the definitions in the appended claims.

I claim:

1. A process for the manufacture of metacresol which comprises the steps of selectively sulfonating a mixture of chlorotoluene isomers containing metachlorotoluene to effect selective formation of metachlorotoluene sulfonic acid, separating said metachlorotoluene sulfonic acid from unreacted chlorotoluenes, hydrolyzing said acid to form metachlorotoluene, forming metacresol while minimizing isomerization to ortho- and paracresol by subjecting said metachlorotoluene for at least fifteen minutes to hydrolysis with aqueous sodium hydroxide in a concentration from about 5% to about 14% at a temperature from about 600° F. to about 700° F., neutralizing the hydrolysis product mixture, and recovering metacresol from tolyl ethers in the neutralized product mixture.

2. A process as defined in claim 1, wherein the concentration of aqueous sodium hydroxide in the hydrolysis of metachlorotoluene is from about 8% to about 10%.

3. A process as defined in claim 1, wherein the step of selectively sulfonating a mixture of chlorotoluene isomers is effected with the aid of strong sulfuric acid ranging in concentration from 80% sulfuric acid to 20% fuming acid.

4. A process as defined in claim 1, wherein the mixture of chlorotoluene isomers for selective sulfonation contains as much as 45% by weight of metachlorotoluene, based on the total weight of the mixture.

5. A process as defined in claim 1, wherein the step of selectively sulfonating a mixture of chlorotoluene isomers is carried out at a temperature from about 100° F. to about 210° F.

6. A process as defined in claim 1, wherein the step of hydrolyzing metachlorotoluene sulfonic acid is carried out at a temperature from about 300° F. to about 360° F.

7. A process for the manufacture of metacresol, which comprises isomerizing a mixture of chlorotoluenes containing less than 45% by weight of metachlorotoluene with an aluminum chloride catalyst at a temperature from about 200° F. to about 350° F., subjecting the resulting isomerization product mixture to fractional distillation to remove chlorobenzene and chloroxylenes therefrom, selectively sulfonating the remaining mixture of chlorotoluene isomers to effect selective formation of metachlorotoluene sulfonic acid, separating said sulfonic acid from unreacted chlorotoluenes, hydrolyzing said acid at a temperature from about 300° F. to about 360° F. to obtain metachlorotoluene, forming metacresol while minimizing isomerization to ortho- and paracresols by hydrolyzing said metachlorotoluene for at least fifteen minutes with aqueous sodium hydroxide in a concentration from about 5% to about 14% at a temperature from about 600° F. to about 700° F. and at a pressure sufficient to effect the hydrolysis in liquid phase, neutralizing the resulting hydrolysis product mixture, and separating metacresol from tolyl ethers by distillation of the neutralized product mixture.

8. A process as defined in claim 7, wherein the mixture of chlorotoluenes containing less than 45% by weight of metachlorotoluene to be selectively sulfonated contains as much as 45% by weight of metachlorotoluene.

9. A process for the manufacture of metacresol, which comprises the steps of selectively sulfonating a mixture of chlorotoluene isomers containing metachlorotoluene with strong sulfuric acid at a temperature from about 100° F. to about 210° F. to effect selective separation of metachlorotoluene sulfonic acid, separating said metachlorotoluene sulfonic acid from unreacted chlorotoluenes, hydrolyzing said acid at a temperature from about 300° F. to about 360° F. to form metachlorotoluene, forming metacresol while minimizing isomerization to ortho- and paracresols by subjecting said metachlorotoluene for at least fifteen minutes to hydrolysis with aqueous sodium hydroxide in a concentration from about 5% to about 14% and in a mol ratio of at least 2 mols of sodium hydroxide to 1 mol of said metachlorotoluene, and at a temperature from about 600° F. to about 700° F. and under a pressure sufficient to effect the hydrolysis in liquid phase, neutralizing the hydrolysis product mixture, and separating metacresol from tolyl ethers by distillation of the neutralized product mixture.

10. A process as defined in claim 9, wherein the concentration of aqueous sodium hydroxide in the hydrolysis of metachlorotoluene is from about 8% to about 10%.

11. A process for the manufacture of metacresol, which comprises isomerizing a mixture of chlorotoluenes less than 45% by weight of metachlorotoluene with an aluminum chloride catalyst at a temperature from about 200° F. to about 350° F., subjecting the resulting isomerization product mixture to fractional distillation to remove chlorobenzene and chloroxylenes therefrom, selectively sulfonating the remaining mixture of chlorotoluene isomers containing up to 45% by weight of metachlorotoluene with strong sulfuric acid at a temperature from about 100° F. to about 210° F., separating metachlorotoluene sulfuric acid from unsulfonated chlorotoluenes which are recycled to the isomerization step, hydrolyzing said metachlorotoluene sulfonic acid to form metachlorotoluene, forming metacresol while minimizing isomerization to ortho- and paracresols by subjecting said metachlorotoluene for at least fifteen minutes to hydrolysis with aqueous sodium hydroxide in a concentration from about 5% to about 14% at a temperature from about 600° F. to about 700° F. and under a pressure sufficient to effect the hydrolysis in liquid phase, neutralizing the resulting hydrolysis product, and separating metacresol from tolyl ethers by distillation of the neutralized product.

12. A process for selective separation of metachlorotoluene from a mixture of chlorotoluenes containing metachlorotoluene which comprises treating said mixture with strong sulfuric acid ranging in concentration from 80% sulfuric acid to 20% fuming acid at a temperature from about 100° F. to about 210° F., separating metachlorotoluene sulfonic acid from unsulfonated chlorotoluenes, hydrolyzing said sulfonic acid at about 300° F. to about 360° F., and recovering metachlorotoluene.

13. A process which comprises isomerizing a mixture of chlorotoluenes less than 45% by weight of metachlortoluene with an aluminum chloride catalyst at a temperature from 200° F. to about 350° F., separating a mixture of chlorotoluenes from chlorobenzenes and chloroxylenes in the isomerization product, forming metachlorotoluene sulfonic acid by selectively sulfonating said separated mixture of chlorotoluenes at a temperature from about 100° to about 210° F., and recovering said metachlorotoluene sulfonic acid from the sulfonation reaction mixture.

14. A process which comprises selectively sulfonating a mixture of chlorotoluene isomers containing metachlorotoluene with sulfuric acid ranging in concentration from 80% sulfuric acid to 20% fuming acid to effect selective formation of metachlorotoluene sulfonic acid, and recovering said metachlorotoluene sulfonic acid from the sulfonation reaction mixture.

15. A continuous process, which comprises selectively sulfonating a mixture of chlorotoluenes containing metachlorotoluene with strong sulfuric acid ranging in concentration from 80% sulfuric acid to 20% fuming acid at a temperature from about 100° F. to about 210° F., separating said metachlorotoluene sulfonic acid from unreacted chlorotoluenes, reacting said metachlorotoluene sulfonic acid with molten alkali metal hydroxide at a temperature from about 600° F. to about 650° F. in an inert atmosphere in a mol ratio from about 6 to about 11 mols of the hydroxide to 1 mol of said sulfonic acid for about two hours, dissolving in water and acidifying the reaction product, and recovering dihydroxytoluenes therefrom by solvent extraction.

16. A continuous process, which comprises selectively sulfonating a mixture of chlorotoluenes containing metachlorotoluene with strong sulfuric acid ranging in concentration from 80% sulfuric acid to 20% fuming acid at a temperature from about 100° F. to about 210° F. to effect selective formation of metachlorotoluene sulfonic acid, separating said metachlorotoluene sulfonic acid from unreacted chlorotoluenes, neutralizing said metachlorotoluene sulfonic acid, reacting said neutralized sulfonic acid with molten alkali metal hydroxide at a temperature from about 600° F. to about 650° F. in an inert atmosphere in a mol ratio from about 5 to about 10 mols of the hydroxide to 1 mol of the sulfonic acid for about two hours, dissolving in water and acidifying the reaction product, and recovering dihydroxytoluenes therefrom by solvent extraction.

17. A process for the manufacture of metacresol, which comprises isomerizing a mixture of chlorotoluenes substantially consisting of ortho- and parachlorotoluenes with an aluminum chloride catalyst at a temperature from about 200° F. to about 350° F., subjecting the resulting isomerization product mixture to fractional distillation to remove chlorobenzene and chloroxylenes therefrom, selectively sulfonating the remaining mixture of chlorotoluene isomers containing up to 45% by weight of metachlorotoluene with strong sulfuric acid at a temperature from about 100° F. to about 210° F., separating metachlorotoluene sulfuric acid from unsulfonated chlorotoluenes which are recycled to the isomerization step, hydrolyzing said metachlorotoluene sulfonic acids to form metachlorotoluene, forming metacresol while minimizing isomerization to ortho- and paracresols by subjecting said metachlorotoluene for at least 15 minutes to hydrolysis with aqueous sodium hydroxide in a concentration from about 5% to about 14% at a temperature from about 600° F. to about 700° F. and under a pressure sufficient to effect the hydrolysis in liquid phase, neutralizing the resulting hydrolysis product mixture, and separating metacresol from tolyl ethers by distillation of the neutralized product mixture.

18. A process which comprises isomerizing a mixture of chlorotoluenes substantially consisting of ortho- and parachlorotoluenes with an aluminum chloride catalyst at a temperature from 200° F. to about 350° F., separating a mixture of chlorotoluenes containing metachlorotoluene from chlorobenzene and chloroxylenes in the isomerization product, forming metachlorotoluene sulfonic acid by selectively sulfonating said separated mixture of chlorotoluenes at a temperature from about 100 to about 210° F., and recovering said metachlorotoluene sulfonic acid from the sulfonation reaction mixture.

ROBERT J. MILLER.

REFERENCES CITED

The following references are of record in the file of this patent:

UNITED STATES PATENTS

| Number | Name | Date |
| --- | --- | --- |
| 1,025,615 | Elger | May 7, 1912 |

FOREIGN PATENTS

| Number | Country | Date |
| --- | --- | --- |
| 159,837 | Great Britain | Feb. 16, 1922 |

OTHER REFERENCES

Shreve et al., Ind. Eng. Chem., vol. 38, 254–261 (1932).

Norris et al., Jour. Am. Chem. Soc., vol. 61, 2128–31 (1939).

Wynne, Jour. Chem. Soc., vol. 61, 1075 (1892).